United States Patent [19]

Ospelt

[11] 4,149,590
[45] Apr. 17, 1979

[54] ROOF DEVICE FOR AIR CONDITIONING

[75] Inventor: Gustav Ospelt, Vaduz, Liechtenstein

[73] Assignee: Interliz Anstalt, Vaduz, Liechtenstein

[21] Appl. No.: 812,445

[22] Filed: Jul. 5, 1977

[30] Foreign Application Priority Data

Jul. 8, 1976 [DE] Fed. Rep. of Germany ....... 2630667

[51] Int. Cl.² .............................................. F24D 5/10
[52] U.S. Cl. ........................................ 165/53; 165/58; 165/108; 165/59; 62/DIG. 16
[58] Field of Search .................. 165/53, 57, 58, 59, 165/67, 75, 103, 108, DIG. 12; 62/DIG. 16, 259

[56] References Cited

U.S. PATENT DOCUMENTS

| | | | |
|---|---|---|---|
| 2,779,572 | 1/1957 | Holman | 62/259 X |
| 3,270,738 | 9/1966 | Nielsen | 165/53 X |
| 3,926,249 | 12/1975 | Glancy | 165/DIG. 12 |
| 4,034,803 | 7/1977 | Reed et al. | 165/103 |

Primary Examiner—Edgar W. Geoghegan
Attorney, Agent, or Firm—Martin A. Farber

[57] ABSTRACT

An air-conditioning device having a common housing case in which there are a heat exchanger through which used air and fresh air can flow formed with plate-shaped heat-exchanger walls which are made of aluminum foil, as well as a fresh-air blower and a spent-air blower. The interior of the housing case is divided into a fresh-air passage leading through the heat exchanger and a spent-air passage leading through the heat exchanger by the stack of foils of the heat exchanger together with internal partitions in the interior of the housing; the housing partitions comprise a controllable by-pass damper through which the spent-air entry side of the heat exchanger can be connected directly to its spent-air outlet side, and comprise a controllable recirculated-air damper through which the spent-air entry side of the heat exchanger can be connected directly to its fresh-air outlet side, the fresh-air inlet and the exhaust-air outlet of the housing case being constructed so as to be able to be shut off. The lower side of the housing case comprises a base which can be sealingly placed on a roof aperture and which jointly possesses an inlet to the spent-air passage and an outlet to the fresh-air outlet comprising a projection nozzle which concentrates the stream of fresh air which is blown out.

11 Claims, 3 Drawing Figures

ROOF DEVICE FOR AIR CONDITIONING

The invention relates to an air-conditioning or climate device for external mounting, particularly on the roof of factory buildings or similar large-area buildings, for the removal of used air and for the supply of tempered fresh air.

Central roof air-conditioning plants for external mounting on the flat roofs of buildings are known which serve to supply and remove air and which contain a radiator which can be operated with pumped hot water or with gas firing or even electrically, for the heating, and/or a refrigeration machine for the cooling. These devices concern a central system for the air-conditioning of a building, from which with connecting air-distribution ducts, the fresh air is brought to the various points, for example to various points of a workshop, and the used air is conveyed back thereto from the various points through further ducts. Thus the central roof air-conditioning systems designed for the central air-conditioning of a plurality of rooms of a building or parts of a building require the installation of separate and costly fresh-air ducts and spent-air ducts. It is difficult or impossible to convert these duct installations when a change is required in for example the fresh-air distribution or in the drawing off of spent air.

Also, with existing buildings, often it is no longer possible, or would involve very high costs, to lay the ducts necessary for such a central system. Moreover, because of their size and weight, these known central air-conditioning systems often cannot be used for erection on comparatively weak factory roofs, for example on shed-type or north-light roofs. Furthermore, the conventional, known roof central air-conditioning systems are constructed such that during heating operation, a portion of the warm spent air again can be mixed with the fresh air in order thus to utilize the heat in the spent air, the latter used as recirculated air. The rest of the spent air is blown out directly as exhaust air. This has the disadvantage that not only during operation with partially recirculated air, but also particularly when no recirculated air operation is desired or can be effected and 100% of the spent air is blown out as exhaust air and operated with 100% new fresh air, the heat in the spent air is wasted and the heat necessary for heating the fresh air must be supplied anew entirely in the form of costly heating energy via the radiator. It is true that plate-type heat exchangers are known per se for the recovery of heat from the spent air, but these are heavy built-on or mounted units of large volume for central air-conditioning plants which are erected and installed in closed rooms inside of buildings.

Because of the above-mentioned installation difficulties and special application possibilities of the known roof central air-conditioning systems, large areas, such as production shops, warehouses, workshops or the like are often, and to a wide extent, still air-conditioned in a manner such that ventilators are provided at various places on the roof of the building, for example, at every second or third saw-tooth or shed, of the shed-type north-light roof of a factory, and that the heating of the areas is effected with separate air-circulating heaters or wall heating devices with the supply of fresh air. It is true that a plurality of desired or appropriate locations in space can have air removed, aerated and be heated in a flexible manner with these devices. These devices and systems, respectively, have the disadvantages however that warm spent air is discharged into the atmosphere, often in large quantities, without any recovery of heat and consequently a great deal of expensive heating energy which has been supplied is wasted, that also waste heat from machines or from technical processes or from illumination and the like is surrendered to the atmosphere without being used, that separate, duplicate installations are necessary for the heating and ventilation, and that roof ventilators which only remove spent air may lead to uncontrolled streams of air and hence draft phenomena through doors and the like.

It is an object of the present invention to provide an air-conditioning device with which the disadvantages of the above-mentioned large-scale space ventilation and large-scale space heating systems by means of separate, duplicated installations can be avoided, as well as the disadvantages of the mentioned central systems with central roof air-conditioning devices, which can be erected, in the form of a plurality of pieces, as compact and complete individual devices with low installation costs, on any desired position on the roofs of factory halls or similar large-area buildings, and which makes possible the decentralized supply and removal of air at a plurality of selected points with the economical use of energy and which, as a result, for example, is also suitable for the reorganization of old factory buildings with particular advantage, where a subsequent use of conventional roof central air-conditioning systems is not possible.

The air-conditioning device according to the invention in the first place is characterised in that in a common housing case of the device there are provided a heat exchanger through which used air and fresh air can flow formed with plate-shaped heat-exchange walls which are made of aluminum foil, as well as a fresh-air blower and a spent-air blower. Furthermore the interior of the housing case is divided into a fresh-air passage leading through the heat exchanger and a spent-air passage leading through the heat exchanger by the stack of foils or foil packet of the heat exchanger together with internal partitions in the interior of the housing; the housing partitions comprise a controllable by-pass flap or valve through which the spent-air entry side of the heat exchanger can be connected directly to its spent-air outlet side, and comprise a controllable recirculated-air valve through which the spent-air entry side of the heat exchanger can be connected directly to its fresh-air outlet side, the fresh-air inlet and the exhaust-air outlet of the housing case being constructed so as to be able to shut off. Furthermore the lower side of the housing case consists of a base which can be sealingly placed on a roof aperture and which jointly possesses an inlet to the spent-air passage and an outlet to the fresh-air outlet comprising a projection nozzle which concentrates the stream of fresh air which is blown out.

This air-conditioning device combines the blowers necessary for the air extraction and the air supply occurring at the same point of the roof, as well as the aluminum-foil heat exchanger, the latter making possible a recovery of spent-air heat in an economical manner from the energy point of view, into a single compact device which can be decentrally mounted on roofs, that is at a plurality of points, and particularly where it is desired to blow-in air and which therefore does not require any installation of ducts. This decentralized supply and removal of air with the air-conditioning device according to the invention is considerably more flexible than the central system with the conventional central roof air-conditioning device. Because of the use of the aluminum-foil heat exchanger, which is distinguished by an exceptionally large heat-exchange area in a small space and with a very low weight, the heat from the spent air can be recovered to a large extent and it is therefore possible to operate with 100% spent air and with 100% fresh air in a particularly economical manner from the point of view of energy, as is necessary in numerous cases. Not only can the heating energy, but also the heat produced by machines, technical processes or even by illumination, be usefully recovered from the spent air. Furthermore, despite the integrated recovery of heat from the spent air, the air-conditioning device has a low weight so that it can easily be erected on the roofs of factory halls, north-light shed roofs and the like, and the air-conditioning device with the built-in aluminum-foil heat exchanger also takes up considerably less space and is therefore cheaper than previous devices. Only a single roof aperture or passage, respectively, through a roof is needed for the erection of the air-conditioning device. The fresh air is blown directly from above into the occupied or working region, respectively, of the hall or of the large space by means of the projection nozzle, and surrounding air in the room is drawn in by the concentrated or bundled stream of fresh air emerging from the projection nozzle so that the moving volume of the stream increases. As a result a greater exchange of air is produced and a more fundamental removal of spent air from the occupied and working region, respectively, back to the spent-air suck-in intake point of the air-conditioning device is effected. The projection nozzle may advantageously be provided with an adjustable set of swirl vanes by means of which the angle of the stream and thus also the projection range can be varied within wide limits. In summer, for example, when heating of the fresh air is not necessary, the spent air can be exhausted by means of the by-pass flap valve damper, by-passing the aluminum-foil heat exchanger, so that substantially no spent air flows through the heat exchanger and no heating of the fresh air occurs in the heat exchanger. On factory rest days, for example, the spent air can be blown in again directly as recirculated air by means of the recirculated-air flap valve damper, by-passing the heat exchanger, so as, for example, during a heating operation, to save expenses for the heating of the fresh air.

In a particularly advantageous form of embodiment of the invention, an air heater and/or an air cooler which is connected to the projection nozzle may be disposed between the fresh-air outlet of the base and the projection nozzle. In this manner, the air-conditioning device has an integrated component, in a compact form of construction, in order to be able to serve simultaneously for the heating, that is in order to heat the fresh air which is preheated by the heat recovery from the spent air to the fresh-air temperature necessary for the space or room heating, or in order to cool the fresh air additionally to a temperature below the outside temperature when the outside temperature is high and the by-pass damper is open.

A spent-air filter may advantageously be disposed at the spent-air inlet of the base, as a further integrated component of the complete air conditioning device, which together with the projection nozzle, can be guided through a single passage or opening in the roof, so that the use of a spent-air filter does not require any additional installation expense. When a spent-air filter is disposed on the base of the case of the device, the mouth of the projection nozzle preferrably is located at a greater distance from the base than the inlet of the spent-air filter.

With the above and other objects and advantages in view, the present invention will become more clearly understood in connection with the following detailed description of a preferred embodiment, when considered with the accompanying drawings, of which:

Figure 1:
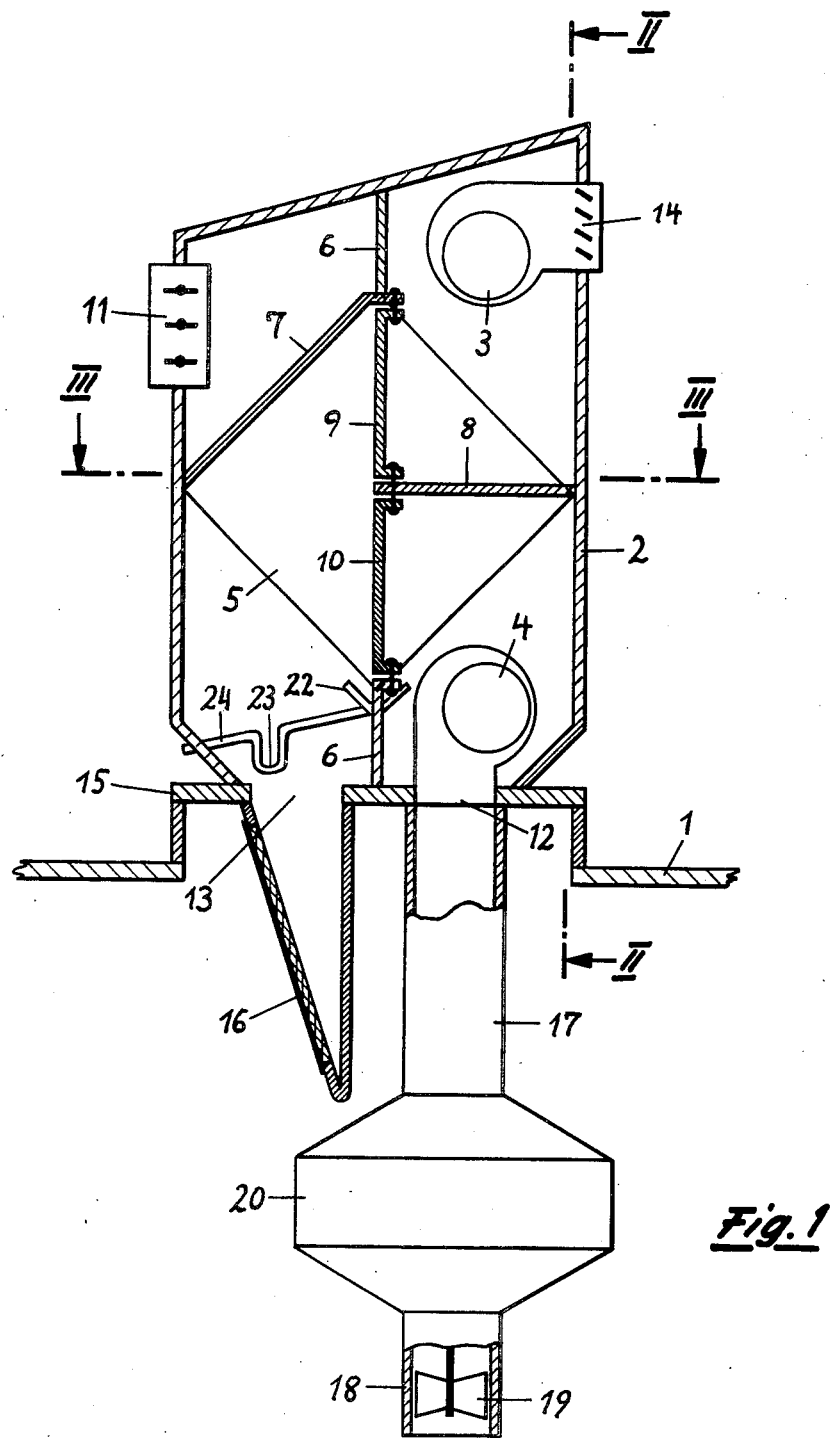
FIG. 1 is a side view of the air-conditioning device of the present invention, partially in vertical section.

Referring now to the drawings, the air-conditioning device has a housing case 2, which is suitable for external mounting on a roof 1 and in which there are disposed two blowers 3 and 4 and a heat exchanger 5, the heat-exchange walls of which are made of aluminum foil and which is divided into two packets or stacks 5 which are spaced apart from one another (FIG. 2) and which are disposed in the housing case standing on one corner (FIG. 1). At their respective outermost sides, the two stacks bear sealingly air-tight against the housing case 2. Above and below, housing partitions 6 are provided which form an air-tight closure between the two heat-exchanger stacks and the housing case 2. Secured to and between the two stacks there is provided an oblique housing partition 7 which forms an air-tight closure between the upper housing partition 6 and the housing case 2, which cooperatively form the fresh air intake chamber at the upper left-hand corner of FIG. 1 from which the fresh air can only pass diagonally down through the heat-exchanger stacks to the lower right-hand chamber. Also situated between the two stacks is a horizontal housing partition 8 which extends from the housing case 2 to the middle of the free space between the two stacks. Above this horizontal housing partition 8, a vertical by-pass valve flap damper 9 forms a termination or closure to the upper housing partition 6; below the housing partition 8, a vertical recirculated-air valve flap damper 10 forms a termination or closure to the lower housing partition 6.

Figure 2:
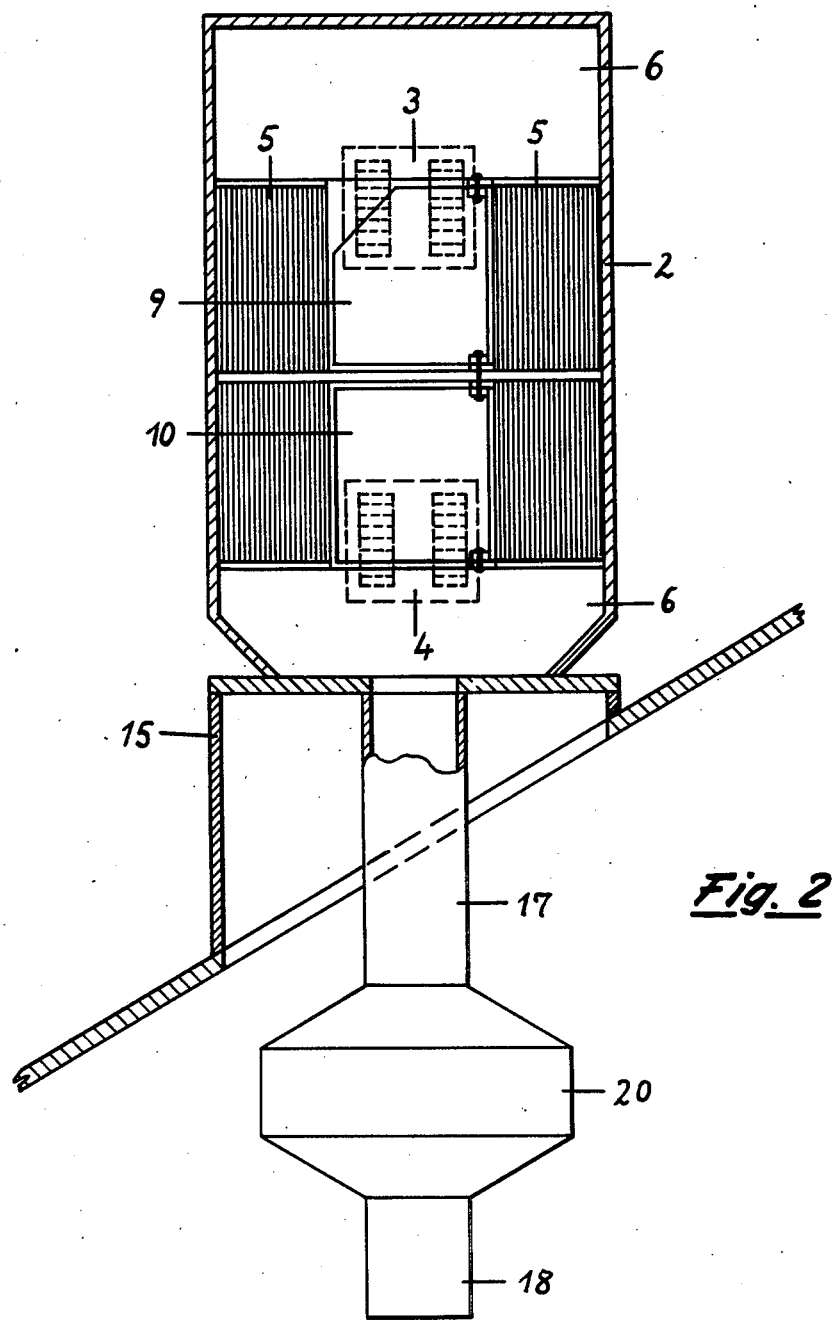
FIG. 2 is a vertical section taken along the line II—II in FIG. 1.
Figure 3:
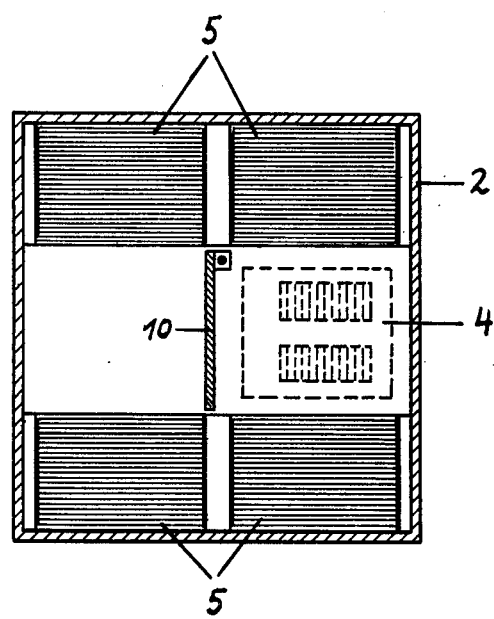
FIG. 3 is a horizontal section taken along the line III—III in FIG. 1.

The horizontal wall 8 in cooperation with the lower damper 10 and the lower partition 6 closes off the lower-right hand fresh air outlet chamber; the horizontal wall 8 in cooperation with the upper damper 9 and the upper partition 6 closes off the upper right-hand spent air exhaust chamber (FIG. 2). The lower left-hand spent air inlet chamber is isolated by the lower partition 6, the lower and upper dampers 10 and 9 and the oblique fixed partition 7. The heat-exchange packets, between the plates form alternating fresh air and spent air passages only communicating therethrough, the upper left-hand fresh air intake chamber with the lower-right hand fresh air outlet chamber on the one hand, and communicating the lower spent-air intake chamber with the upper-right hand spent air outlet chamber. The respective air flows through the heat-exchange packets in FIG. 1 are diagonally cross-flow. The stacks or packets 5 are preferably square in shape.

In this manner, two passageways for fresh air and spent air, respectively, leading through the heat exchanger, are divided off in the interior of the housing. The fresh air or intake air entering through the fresh-air inlet 11 of the housing case 2 enters into the upper left fresh air intake chamber and the two heat-exchanger stacks 5 at both lateral sides of the oblique housing partition 7 and is drawn through the heat exchanger 5 obliquely from the top downwards by the blower 4 into the lower right fresh air outlet chamber and is conveyed further through an outlet 12 of the fresh-air passage which is divided-off in the interior of the housing. The spent air after use enters through an inlet 13 of the spent-air passage the lower left-hand spent air intake chamber and is then drawn through the two heat-exchanger stacks obliquely from the bottom upwardly by the blower 3 when the dampers 9 and 10 are closed, into the upper right spent air outlet chamber and is blown out into the atmosphere through an exhaust-air outlet 14 in the housing case.

The lower side of the housing case 2 comprises a base 15 which has the fresh-air outlet 12 and the spent-air inlet 13 formed therein, and with which the housing case is mounted, in a sealing manner, on an aperture in the roof 1, only one of which has to be provided for the installation of the air-conditioning device of the invention. At the spent-air inlet 13, the base 15 has a spent-air filter 16 which can be inserted through the aperture in the roof when the air-conditioning device is mounted. Fitted or joined-on at the fresh-air outlet 12 of the base 15 is an extention 17 which can likewise be inserted through the aperture in the roof and the lower end thereof, which extends lower down than does the spent-air filter inlet, comprises a projection nozzle 18 which concentrates the stream of blown out fresh air and which is provided with an adjustable set of swirl vanes 19 or the like by means of which the stream angle and thus also the projection range of the projection nozzle 18 can be varied.

Disposed between the fresh-air outlet 12 of the base 15 and the projection nozzle 18 is an air heater 20 in which the fresh air can be heated to the required temperature, for example by means of finned tubes through which hot water flows or by means of electrical heating. An air cooler may also be provided instead of the air heater 20 or in combination with the air heater 20 in order to cool the fresh air to be supplied if necessary.

The two valve flap dampers 9 and 10 are horizontally pivotable about vertical axes and can be adjusted by means of control devices, not illustrated. In summer, for example, when no heat exchange should occur between the spent air and the fresh air in the heat exchanger 5, the by-pass damper 9 is opened communicating the lower left spent-air intake chamber directly with the upper right spent air outlet chamber, so that the warm spent air does not flow through the heat exchanger 5 because of its higher flow resistance, but is drawn in and blown out directly by the blower 3, centrally between the two heat-exchanger stacks through the open by-pass damper 9, by-passing the heat exchanger 5.

If no fresh air is to be introduced during factory rest periods, for example on Sundays and holidays, but instead recirculated-air operation is to be used, the recirculated-air damper 10 is opened, with the by-pass damper 9 closed, so that the spent air entering the housing through the spent-air inlet 13 into the lower left spent air intake chamber is drawn-in by the blower 4 between the two heat-exchanger stacks through the open recirculated-air damper 10, into the lower right outlet chamber by-passing the heat exchanger and the spent-air is conveyed back into the building space through the outlet 12. During recirculated-air operation, the blower 3 is switched off. The exhaust-air outlet 14 of the housing case includes a louver which closes automatically, and which is opened by the stream of spent air when the blower 3 is running, and closes when the blower 3 is switched off, so that no outside air can be drawn in through the exhaust-air outlet 14 and the heat exchanger 5 by the blower 4.

The fresh-air inlet 11 of the housing case 2 is formed by a louver which can be actuated by means of a control device (not illustrated), and which is set in the open position during fresh-air/spent-air operation and is closed during recirculated-air operation, so that no outside air can be drawn in by the blower 4 through the fresh-air inlet 11 during recirculated-air operation. In order to prevent freezing up of the heat exchanger in its cross sections constituting the spent air passages through which the spent air flows, during fresh-air/spent-air operation with low outside temperatures and moist spent air, the recirculated-air damper 10 may be partially opened, for example by means of an outside thermostat, and at the same time the louver of the fresh-air inlet 11 may be correspondingly partially closed, as a result of which the proportion of spent air and fresh air flowing through the heat exchanger can be changed so that the temperatures in the heat exchanger remain above the freezing limit.

Disposed communicating with and below the lowest point of that portion of the two heat-exchanger stacks through which the spent air flows, namely the spent air passages thereof, as illustrated in FIG. 1, is a collecting trough 22, to which there is connected a drain pipe 24 which is led out of the housing case 2 and contains a siphon 23. With this device, any condensate which may be present under the circumstances which appears at the spent-air side of the heat exchanger can be conveyed directly or immediately straight out of the housing case of the air-conditioning device onto the roof without the necessity of having long outlet pipes into a sewer or canal system.

The base 15 may be so constructed that the air-conditioning device can be mounted on shed or north-light roofs, flat roofs or other roof forms which occur. Because of its low weight, achieved by the use of the aluminium-foil heat exchanger, the air-conditioning device can also be mounted on the roofs of factory halls and, because of its compact form of construction, it only requires the provision of a single, simple roof opening for mounting. A plurality of air-conditioning devices can be disposed on one roof, and this can be done conveniently at the points where an intensive extraction of air and blowing in of fresh air at a certain temperature is required, and, if necessary, it can be transferred to another point on the roof with little expenditure of conversion. The air-conditioning device according to the invention therefore has the great advantage of a decentralized and extremely flexible ventilating system which is particularly suitable both for new and for existing old factory halls, workshops or similar large areas and so closes a gap, which has not previously been filled by the known central roof air-conditioning plants, in the requirements for a modern ventilating system which is economical with regard to energy.

By the illustrated embodiment both blowers suck the air streams through the heat exchanger, however it is also possible for the two blowers to press the air streams through the heat exchanger.

While I have disclosed one embodiment it is to be understood that this embodiment is given by example only and not in a limiting sense.

I claim:

1. An air-conditioning device for external mounting, particularly on the roof of factory halls or similar large-area buildings for drawing off spent air and supplying tempered fresh air, comprising a common housing case defining an interior, a heat exchanger disposed in the interior of said housing case adapted to pass fresh air and spent air therethrough comprising a plurality of spaced panel-shaped heat exchanger walls made of aluminium foil defining non-communicating adjacent alternating fresh-air passages and spent-air passages, respectively, a fresh-air blower means in the interior of said housing case communicating with said fresh-air passages of said heat exchanger, and a spent-air blower means in the interior of said housing case communicating with said spent-air passages of said heat exchanger, partition means disposed in the interior of said housing case cooperating with said heat exchanger for dividing the interior of said housing case into a fresh-air passageway leading through said heat exchanger and including said fresh-air passages thereof and a spent-air passageway leading through said heat exchanger and including said spent-air passages thereof, said partition means include a controllable by-pass damper means for directly connecting a spent-air inlet side to a spent-air outlet side of said heat exchanger, and a controllable recirculated-air damper means for directly connecting said spent-air inlet side to a fresh-air outlet side of said heat exchanger, a closeable fresh-air inlet means for admitting fresh air into said housing case and a closeable exhaust-air outlet means for exiting of spent air from said housing case, and a base means disposed on a lower side of said housing case for being mounted sealingly on an aperture in a roof, said base means jointly is formed with a spent-air inlet of said base means communicating with said spent-air inlet side of said heat exchanger as well as a fresh-air outlet of said base means communicating with said fresh-air outlet side of said heat exchanger, said fresh-air outlet of said base means includes a projection nozzle adapted to concentrate a stream of fresh blown-out air.

2. The air-conditioning device as set forth in claim 1, further comprising a spent-air filter disposed in said spent-air inlet in said base means, said spent-air filter and said projection nozzle are closely adjacent to one another and together are adapted to be inserted through a single aperture in a roof, and said projection nozzle defines a mouth located lower than said spent-air inlet and said spent-air filter.

3. The air-conditioning device as set forth in claim 1, further comprising an air heater communicating with said projection nozzle disposed in said base means between said fresh-air outlet of said base means and said projection nozzle.

4. The air-conditioning device as set forth in claim 1, further comprising an air cooler communicating with said projection nozzle disposed in said base means between said fresh-air outlet of said base means and said projection nozzle.

5. The air conditioning device as set forth in claim 1, further comprising an air heater and an air cooler communicating with said projection nozzle disposed in said base means between said fresh-air outlet of said base means and said projection nozzle.

6. The air-conditioning device as set forth in claim 1, wherein said projection nozzle includes an adjustable set of swirl vane means for varying a stream angle of air leaving said projection nozzle.

7. The air-conditioning device as set forth in claim 1, wherein said fresh-air blower means is connected at an intake side thereof to said fresh-air outlet side of said heat exchanger, and said spent-air blower means is connected at its intake side to said spent-air outlet side of said heat exchanger, said closeable exhaust-air outlet means of said housing case comprises a first louver means for automatically closing air flow therethrough counter to the direction of blowing-out of the spent air, a controllable second louver means for closing said closeable fresh-air inlet means from admitting fresh air into said housing case.

8. The air-conditioning device as set forth in claim 1, further comprising a condensate-collecting trough communicating with said spent-air passages of said heat exchanger at a lowest point thereof, a drain pipe containing a siphon is connected to said trough and extends out of said housing case into the open air.

9. The air-conditioning device as set forth in claim 1, wherein said heat exchanger of aluminum foil comprises two rectangular stacks of said heat exchanger walls, said rectangular stacks are disposed obliquely standing respectively on one respective lower corner thereof in said housing case and are spaced apart defining inner spaced faces disposed opposite one another, and said stacks include outer faces sealingly adjoining tightly onto said housing case, said two stacks are connected sealingly tight to said housing case at laterally positioned front and rear corners thereof, said partition means include, two fixed vertically planarly aligned vertical housing partitions sealingly connected to said housing case and connected to upper corners and said lower corners, respectively, of said stacks, an oblique fixed partition extends from the upper corners of said stacks to the rear corner of said stacks sealingly connected to said two stacks closing the space between said stacks, a fixed horizontal dividing partition extends from the front corners of said stacks and said housing case adjacent thereto sealingly against said housing case and said stacks extending therebetween in the space between said two stacks to a position of an imaginary plane defined by said two vertical housing partitions, and said controllable by-pass damper means and said controllable recirculated-air damper means constitute vertical shut-off dampers disposed, respectively, above and below said fixed horizontal dividing partition and said vertical housing partitions, pivotally mounted, said spent-air blower means for drawing spent air through said spent-air passages of said two stacks is disposed above said horizontal dividing partition, and said fresh-air blower means for drawing fresh air through said fresh-air passages of said two stacks is disposed below said horizontal dividing partition.

10. The air-conditioning device as set forth in claim 1, wherein both of said blower means suck air through said heat exchanger.

11. The air-conditioning device as set forth in claim 1, wherein both of said blower means press air through said heat exchanger.

* * * * *